United States Patent [19] [11] Patent Number: 4,846,075
Tupper [45] Date of Patent: Jul. 11, 1989

[54] LOCKABLE LOAD ATTACHMENT DEVICE
[75] Inventor: Alan W. Tupper, Chippenham, England
[73] Assignee: Latchways Limited, Chippenham, United Kingdom
[21] Appl. No.: 116,512
[22] Filed: Nov. 2, 1987
[30] Foreign Application Priority Data
Nov. 14, 1986 [GB] United Kingdom ............... 8627320
[51] Int. Cl.⁴ .................. A62B 35/00; E06C 7/18
[52] U.S. Cl. .................. 104/209; 104/204; 104/211; 188/65.1; 188/65.2; 182/5
[58] Field of Search ............ 104/202, 204, 205, 208, 104/209, 212, 216, 222, 224, 173.1; 188/65.1, 65.2; 182/142, 145, 4, 5

[56] References Cited
U.S. PATENT DOCUMENTS

| | | | |
|---|---|---|---|
| 2,561,514 | 7/1951 | Housemen | 188/65.2 |
| 2,780,318 | 2/1957 | Owens | 188/65.2 X |
| 3,146,754 | 9/1964 | Ohnsman | 188/65.1 X |
| 3,776,368 | 12/1973 | Brauss | 182/145 X |
| 4,034,828 | 7/1977 | Rose et al. | 188/65.2 X |
| 4,254,941 | 3/1981 | Tanson | 188/65.1 X |
| 4,521,000 | 6/1985 | Dodge, Jr. | 188/65.2 X |
| 4,542,884 | 9/1985 | Dodge, Jr. | 188/65.1 X |
| 4,669,582 | 6/1987 | Sandreid | 188/65.1 |

FOREIGN PATENT DOCUMENTS 0042696  4/1977  Japan ................... 182/5
2096959  10/1982  United Kingdom .

Primary Examiner—Andres Kashnikow
Assistant Examiner—Richard Potosnak
Attorney, Agent, or Firm—Frishauf, Holtz, Goodman & Woodward

[57] ABSTRACT

A load attachment device attaching a person to a safety line to provide a fall-arrest facility, comprises a slipper member for engaging an elongate member for sliding movement therealong, and load sensitive locking member having an unlocked condition perimitting free sliding movement of the device and a locked condition in which a grip portion of the locking member engages and grips an elongate member slidably engaged, in use, with the slipper member, the locking member including biassing member to cause the locking member to be brought automatically into its locked condition when an applied loading, which is required to maintain the locking member in its unlocked condition on an inclined, or a vertical or near vertical elongate member, or portions of an elongate member, is removed.

14 Claims, 6 Drawing Sheets

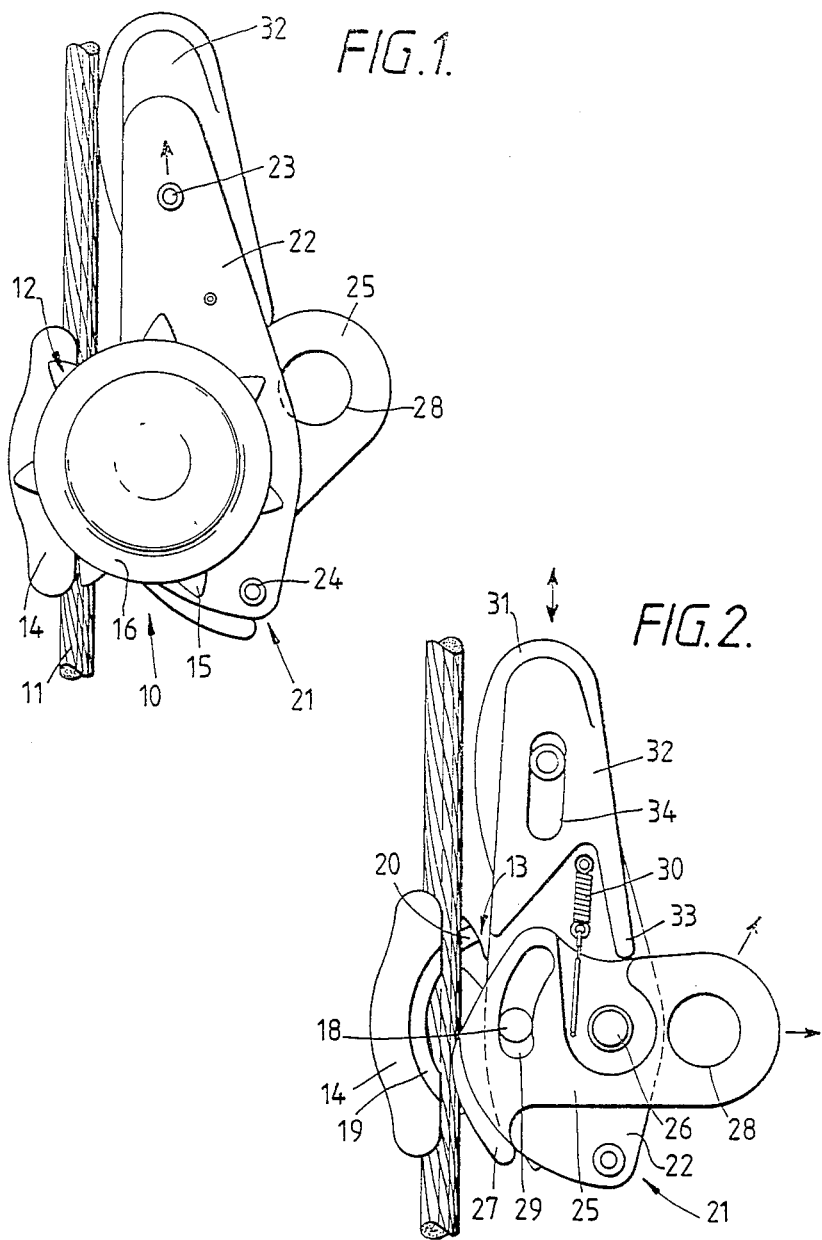

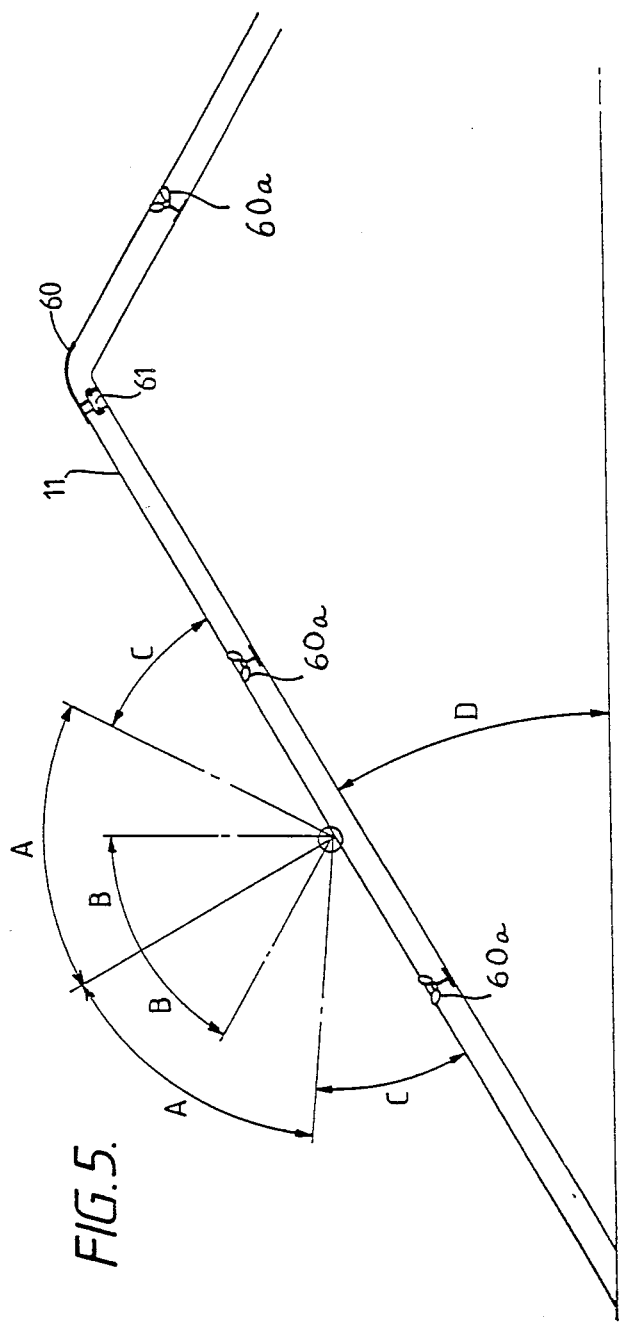

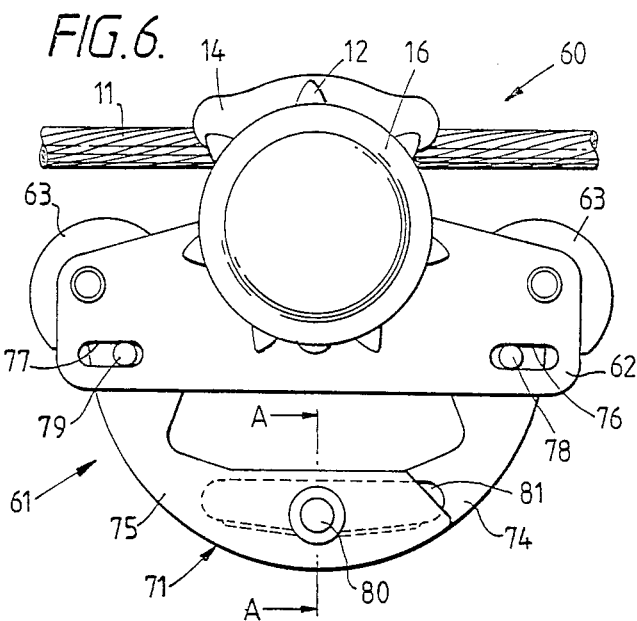
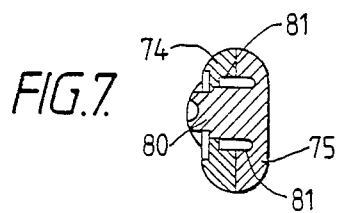
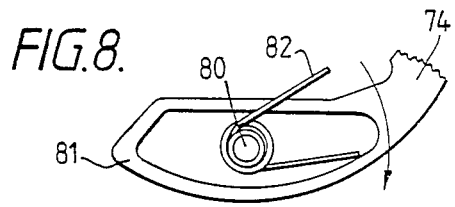

LOCKABLE LOAD ATTACHMENT DEVICE

The invention relates to a load attachment device for enabling a load to be moved along a path defined by an inclined, or vertical or near vertical elongate guide member, or portion thereof, and preferably freely past any intermediate support or attachment points which may be provided for the guide element. Such a device is described in British Patent Specification No. 1582201 and corresponding U.S. Pat. No. 4,265,179. The present invention provides a load attachment device which is adapted to enable the device to be releasably locked to the elongate guide member to prevent movement in at least one direction along that member, for example to provide a fall arrest facility for a person secured to an inclined, or a vertical or near vertical safety line by the device.

Our British Pat. No. 2,096,959 describes traversing devices for sliding along elongate members past attachment points thereof, which are provided with pivotally mounted locking cams which positively lock the devices to the elongate elements when a load attached to the device is applied in one direction along the elongate members. If such a device is used to secure a person with respect to a steeply inclined, or a vertical or near vertical safety line, there is a danger that locking of the device may not occur in a fall arrest situation. This is because, when the tension in a lanyard of a safety harness, which is hooked onto one end of the locking cam, is relieved there is no positive locking action of the device. In a fall situation where the tension in the lanyard is relieved, the device is still free to fall under its own weight down the safety line whereby no fall arrest action is achieved.

The invention seeks to provide an improved device which overcomes or minimizes this disadvantage of the above-described devices by providing automatic locking of the device once the applied load is relieved. A preferred feature of the invention also provides a device which, when grabbed in an emergency, is adapted to bring about a reinforcement of the locking action of the device.

The invention provides a load attachment device comprising a slipper member for engaging an elongate member for sliding movement therealong, and load sensitive locking means having an unlocked condition permitting free sliding movement of the device and a locked condition in which a grip portion of the locking means engages and grips an elongate member slidably engaged, in use, with the slipper member, the locking means including biassing means to cause the locking means to be brought automatically into its locked condition when an applied loading, which is required to maintain the locking means in its unlocked condition on an inclined, or a vertical or near vertical elongate member, or portions of an elongate member, is removed.

The invention provides a load attachment device, which comprises at least one wheel having recesses formed in its periphery at spaced locations therearound and separated by projecting parts of the wheel, and a cooperating slipper member located with respect to the wheel, and adapted and arranged to allow rotation of the wheel about its axis with respect to the slipper member while locating an elongate member with respect to the wheel such that when the device is moved along an elongate member slidably engaged with the guide member, transverse supports for such member are received, guided and passed in the recesses of the wheel which then rotates relative to the guide member while the elongate member is located with respect to the wheel by the slipper member; and load sensitive locking means mounted on the wheel, said locking means having an unlocked condition permitting free sliding movement of the device and a locked condition in which a grip portion of the locking means cooperates with a portion of the slipper member so as to enable an elongate member slidably engaged, in use, with the slipper member to be gripped firmly between said portions, and including biassing means for causing the locking means to be brought automatically into its locked condition when an applied loading, which is required to maintain the locking means in its unlocked condition on an inclined, or a vertical or near vertical elongate member, or portions of an elongate member, is removed.

It is therefore necessary for a load, e.g., a tension in a lanyard hooked onto the locking member, to be applied to maintain the device in an unlocked condition in order to permit movement along an inclined, or vertical or near vertical safety line or portion thereof, otherwise the device automatically locks thereonto.

In some embodiments of the invention, said locking means may be adapted to be maintained in said unlocked condition as aforesaid when said loading is applied thereto in a direction within a range defined between a line generally parallel to an elongate member, with which the slipper member is engaged in use, and a predetermined acute angle thereto.

Said locking means may comprise a pivotally mounted locking member having said grip portion formed on a part thereof on one side of the pivotal axis of the locking member and an attachment portion, to which a load can be connected to the device, on the opposite side of said pivotal axis. The grip portion is preferably spaced from the pivotal axis of the member by a greater distance than the attachment portion. This feature gives a locking action which is more load sensitive than a symmetrical arrangement as well as providing greater leverage during a locking action and a mechanical advantage for the locking action when the applied load acts to rotate the locking member in the locking direction.

The locking means may include a body part on which the locking member is pivotally mounted, the biassing means being connected to act between the body part and the locking member so as to bias the locking member towards its locked condition.

Preferably the pivotal axis of the locking member is spaced from the rotary axis of the wheel and positioned on the side thereof remote from the slipper member, the arrangement being such that in a locking condition of the device the locking means tends to rotate, under gravity, about the rotary axis of the wheel assisting in moving the locking member to positive gripping engagement with a line with which the device is engaged in use.

According to a feature of the invention, a movable member is mounted at an upper part of a portion of the body part which projects upwardly from the load-transfer or traversing device, when engaged with a generally vertical elongate member, and has a part engaging the locking member, the arrangement being such that when the device is grabbed in an emergency, the movable member is depressed to act on the locking member so as to cause the locking member to move to its locking condition. The movable member preferably has a portion adapted to slide on an elongate member, with which the device is engaged in use, when a load is applied to the locking member to maintain it in an unlocked position, whereby, when the device accelerates excessively under gravity down the elongate member in an emergency situation, frictional drag induced at the contact points between the elongate member, and the slipper member and the sliding portion of the movable member tends to slow the downward movement of the device so that tension in a safety line attached to the locking member is relieved and the locking member thereby automatically moves to its locking position providing a fall arrest facility.

In other arrangements according to the invention, said locking means may comprise a pivotally mounted locking member having at least one grip portion as aforesaid provided thereon to engage and grip an elongate element on pivotal movement of the locking member in one or both directions, and having an arcuate slot therein formed with a pocket at least at one end of the slot, the pocket being adapted to receive and locate a rolling element located in the slot, the locking member being biassed to a position in which the, or each, grip portion is out of contact with an elongate element engaged in use with said slipper member, and a pivotally mounted load attachment member having a control surface for acting on said rolling element when located in said pocket, the arrangement being such that, when the device moves onto an inclined, or a vertical or near vertical portion of an elongate element, the rolling member moves under gravity from said slot into said pocket, the load attachment member being biassed so that when said loading applied thereto is removed, said control surface acts on the rolling element in said pocket to cause the locking member to pivot and bring the, or the respective, grip portion into locking engagement with an elongate member engaged, in use, with said slipper member.

In other embodiments of the invention, said locking means may be adapted to be maintained in said unlocked condition as aforesaid when said loading is applied thereto in a direction perpendicular to an elongate member, with which the slipper member is engaged in use, and at acute angles thereto up to a predetermined maximum acute angle.

In some constructions according to the invention, said locking means may comprise a body part, at least one locking member pivotally mounted on the body part and having said grip portion provided thereon, and a control linkage for moving the locking member between a locked and an unlocked condition, said linkage comprising a pair of first links pivotally connected together at a set of overlapping ends thereof with the other ends of the links having sliding means engaging in respective slots in the body part, the slots being elongate in a direction generally parallel to an elongate member engaged, in use, with said slipper member, and at least one second link pivotally connected to said other end of a respective first link and to the, or a respective, locking member so that the locking member is moved between its locked and unlocked conditions when the associated sliding means slides along its slot, wherein said first links project from the body part and are adapted to define an enclosed space therebetween enabling a load connector element to be engaged around the first links so that when said loading is applied to the first links, said sliding means move towards adjacent ends of said slots causing the locking member to move to its unlocked condition and when said loading is no longer applied to the first links in a generally outward direction with respect to an elongate member, said biassing means cause the locking member to be moved to its locked condition.

Further constructions according to the invention may comprise a pair of slipper members for slidingly engaging an elongate member at spaced locations therealong, a common body part having a pair of locking members pivotally mounted thereon to cooperate with the slipper members respectively, and a control linkage for moving the locking members between a locked and an unlocked condition, said linkage comprising a pair of first links pivotally connected with respect to one another at a set of overlapping ends thereof with the other ends of the links having sliding means engaging in respective slots in the body part, the slots being elongate in a direction generally parallel to an elongate member engaged, in use, with said slipper members, said sliding means also engaging in further slots formed in said locking members, respectively, so that the locking members are moved between their locked and unlocked conditions when the sliding means slide along the associated slots in the body part, wherein said first links project from the body part to define an enclosed space therebetween enabling a load connector element to be engaged around the first links so that when said loading is applied to the first links, said sliding means move towards adjacent ends of said slots in the body part causing the locking members to move to their unlocked conditions and when said loading is no longer applied to said first links in a generally outward direction with respect to an elongate member, said biassing means cause the locking members to be moved to their locked conditions.

The wheel(s), the slipper member and the parts forming the locking assembly may be fabricated metal parts made, for example, by machining, pressing, forging or casting. Some or all of the elements of the device may be made from a suitable durable plastics material, e.g., Nylon.

The traversing device may have other forms, for example adaptations of the devices described and claimed in British Patent Specification No. 1582201 (and corresponding U.S. Pat. No. 4,265,179) or in British Pat. No. 2,096,958 and corresponding U.S. Pat. No. 4,462,316, the disclosures of which are included herein by reference.

A specific embodiment of the invention will now be described by way of example and with reference to the accompanying drawings in which:

FIG. 1 is a side view of a device embodying the invention;

FIG. 2 is a side view of the device of FIG. 1 with parts thereof removed to show the internal structure;

FIG. 5 is a diagrammatic representation of a safety line arrangement on a roof structure;

FIG. 6 is a side view of a third embodiment;

FIG. 7 is a section along line A-A in FIG. 6;

FIG. 8 is a detail of the embodiment of FIG. 6;

Figure 3:
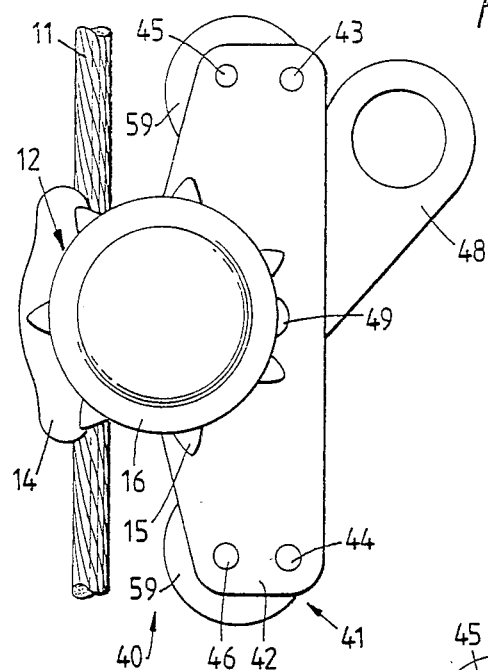
FIGS. 3 and 4 are views similar to those of FIGS. 1 and 2 respectively, of a second embodiment of the invention.

Referring to the drawings, there is shown a fall arrest device (10) embodying the invention which is engaged with a vertical or near vertical safety wire (11) and to which the lanyard of a safety harness can be attached. The safety wire (11) could for example be associated with a ladder and the device (10) slidingly engaged therewith provides a means of restraining a person who may slip or fall from the ladder. Moreover, as described below, the device (10) is so adapted that it can traverse locating hanger members which are engaged with the wire (11) at spaced locations therealong, without the device having to be disengaged from the wire. Such hangers may be in the form of U-shaped elements for engaging around the wire and having attachment means for securing to a fixed structure.

The fall arrest device (10) comprises a load-transfer device of the type described in my British Patent Specification 1,582,202 and corresponding U.S. Pat. No. 4,265,179 for engagement with an elongate element for movement therealong whilst permitting the device to traverse intermediate support points of the elongate member without being detached therefrom. The device comprises a pair of spaced apart wheel elements (12 and 13) with a slipper member (14) being located between the wheels at a peripheral portion thereof. Each wheel (12,13) is formed with 7 radially projecting portions (15) which define therebetween 7 equi-angularly spaced recesses in the periphery of the wheel. The wheels are rotatably mounted on an axle (18). Each wheel is provided with a metal disc (16), e.g. made of steel, located against an end face of the associated wheel which is remote from the other wheel to extend partway along each recess defined in the periphery of the wheel. These discs (16), which are superficially mounted with resilient buffer elements, inhibit engagement of the wire (11) in one of the recesses defined in the wheels so as to prevent "winding-out" of the wire (11) from the load transfer device on rotation of the wheel relative to the slipper member (14). Without the disc and buffer members, such engagement of the wire (11) in a recess in one of the wheels followed by subsequent rotation of the wheel relative to the slipper member could result in complete detachment of the load-transfer device from the wire (11).

The slipper member (14), positioned between the wheels at the peripheries thereof, has a pair of axially projecting, arcuate flanges (19) which engage in correspondingly shaped grooves (20) formed in the inner confronting surfaces of the projecting parts (15) of the wheels, thereby to locate the slipper member (14) in position between the wheels whilst allowing the wheels to rotate complete revolutions in either direction with respect to the slipper member. In this way, U-shaped hanger elements which contain the wire (11) can be received in a pair of corresponding recesses in the wheels and can pass through the device in such recesses as the wheels then rotate relative to the slipper member (14) with the parallel arms of the hanger element embracing the slipper member (14). In this way the device (10) can move up and down the wire (11) past locating hanger elements therefor without being detached from the wire (11).

The device (10) further comprises a locking assembly (21) which is located in the space between the wheels (12,13) to project radially therefrom. The locking assembly (21) comprises a pair of elongate side plate members (22) which are fixed to one another in a spaced apart relationship by a pair of shouldered spacer pins (23 and 24). A locking can member (25) is pivotally mounted between the side plates (22). The cam (25) has a pair of axially aligned circular spigots (26) projecting one on each side thereof, in the manner of a pair of trunnions, for engagement in corresponding holes provided in the side plates (22). The locking cam (25) is therefore pivotally mounted between the side plates (22) about the axis of the spigots (26).

The cam member is formed with a gripping edge formation (27) for acting on the wire (11) so that it is firmly gripped between the cam formation (27) and an opposed arcuate surface in the slipper member (14) which receives the wire (11), when the cam is in its locking position as shown in FIG. 2. The cam is also formed with an aperture (28) for receiving a safety hook device provided, for example, at the end of a lanyard attached to a safety harness. The locking cam (25) is further formed with an arcuate slot (29) through which the axle (18) of the load-transfer device extends. A tension spring (30) is provided to act between the locking cam and the side plates (22) to normally bias the locking cam member into its locking position as shown in FIG. 2.

The locking assembly (21) further comprises a slider member (32) made for example of a plastics material such as Nylon. Slider member (32) has a flat body part located between and generally conforming to upper portions of the side plates (22). The slider member is formed with a rounded thickened section (31) at its upper periphery and side portions adjacent thereto to provide a sliding portion which engages the wire (11). The slider member is further formed with a downwardly projecting finger (33) which engages the locking cam (25) for acting thereon in an emergency situation as described below. The body part of the slider member (32) is formed with an elongate slot (34) through which the upper shouldered spacer (23) of the side plates (22) extends. This arrangement allows a vertical sliding movement of the slider member (32) with respect to the side plates (22).

FIG. 1 shows the positioning of the locking cam member (25) when a generally upwardly directed load is applied thereto, for example by the connection of a lanyard hook to the ring portion (28) of the locking cam member. Such a load will be applied to the device when a person connected thereto is ascending or descending when the fall arrest device (10) will move slidingly up or down the safety wire (11). The device (10) will be "pulled" up the wire (11) when the person secured thereto is climbing, or will drop down the wire (11) under its own weight when the person is descending, whereby tension will be maintained in the securing lanyard thereby maintaining the locking cam member (25) in the position shown in FIG. 1 such that it does not cause jamming of the wire (10) against the slipper member (14). The slider member (32) is moved to its uppermost position with respect to the side plates (22) and its rounded enlarged portion (31) slidingly engages against the wire (11). In such a condition, intermediate support hangers for the wire (11) can be traversed, first by engagement with the slider member (32) which is moved away from the wire (11) sufficiently to allow the hanger to pass and then by engagement of the hanger member in a pair of corresponding recesses in the wheels (12,13) to be moved through the load-transfer device as the wheels then rotate relative to the slipper member (14).

During such traversing operations, the load-transfer device remains connected to the wire (11).

When the upwardly directed load on the locking cam (25) is relieved by the removal of tension in the lanyard, the biassing spring (30) then causes the locking cam (25) to move to the position shown in FIG. 2 whereby the gripping portion (27) of the cam digs into the wire (11) thereby jamming it against the opposed surface of the slipper member (14) and effecting locking of the device to the wire (11). Therefore as soon as tension is relieved in the lanyard, the device is automatically brought into a locked condition. Any loading applied to the locking cam in a generally downward direction, for example applied through the lanyard attached to a person thrown outwardly away from the device or slipping vertically downwards, will merely enhance the jamming effect of the wire between locking cam (25) and the slipper member (14) to provide a secure fall arrest facility.

The slider member (32) provides an additional safety feature in that it can be manually pressed downwardly to act on the locking member (25) through its downwardly projecting finger (33) causing the locking member to be brought firmly into its locked condition. Therefore if a person grabs hold of the fall arrest device (20) in an emergency, it is most likely to cause the downward movement of the slider member (32) from the position shown in FIG. 1 to the position shown in FIG. 2 which causes the device to become locked to the wire (11).

The pivotal location of the locking cam (25) is such as to enhance the locking action of the device. The pivotal axis of the locking cam provided by spigots (26), is considerably nearer the ring portion (28) of the cam than the wire (11). First, this construction gives greater movements for the locking portion (27) of the cam (25) for relatively small movements of the ring portion (28) thereby increasing the sensitivity of the locking action of the cam (25) with respect to movements of the ring portion (28) thereof. Secondly by having the pivotal axis of the locking cam remote from the wire (11) it is possible to increase the leverage of the gripping portion (27) of the cam when it bites into the wire (11). Thirdly, when a downward load is applied to the ring portion (28) of the locking cam in a fall arrest situation, there is a mechanical advantage of about 3:1 in respect of the application of this load at the gripping portion (27) of the locking cam.

It will also be appreciated that when the locking assembly (21) is brought into the locked condition as shown in FIG. 2, the locking assembly (21) rotates about the axle (18) of the load-transfer device under the action of tension spring (30) and its own weight which further assists in maintaining the locking cam in its locked condition.

It is preferred in the above-described embodiment and in the following embodiments that a workman is secured with respect to the safety line by a safety harness or safety belt having a lanyard attachment which incorporates a tear-out type of shock absorbing pack. This pack, which links the Nylon lanyard to the safety belt, comprises a strip of Nylon tear webbing parallel with a main load-bearing webbing. In the event of a fall, the tear webbing pulls apart to absorb the shock load while the additional load-bearing webbing provides an additional safeguard. In this way, it is possible to minimize fall injury to a person secured by a safety belt where it is inconvenient for that person to wear a complete fall safety harness.

Figure 4:
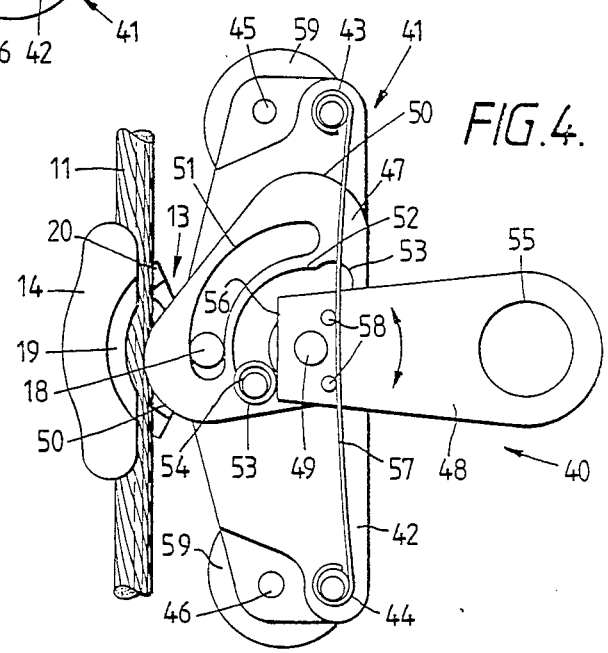

FIGS. 3 and 4 show another embodiment of a fall arrest device (40) according to the invention. Device (40) comprises a load-transfer device as described above in relation to the embodiment of FIGS. 1 and 2 and similar reference numerals have been used for corresponding parts thereof. This embodiment is different principally in the construction of the locking assembly (41) and the description of this embodiment will be therefore limited to the construction of this locking assembly. The locking assembly (41) comprises a pair of elongate side plate members (42) which are fixed to one another in a spaced apart relationship by four shouldered spacer pins (43–46). Between the side plates (42), a locking cam member (47) and a load attachment link (48) are pivotally mounted on an axle (49) extending between the side plates (42).

The cam member (47) is generally triangular in shape and has rounded gripping edge formations (50) formed at the base corners of the triangle for gripping engagement with the elongate member (11) in locking conditions of the device (40). The cam member (47) has a first relatively shallow arcuate slot (51) through which the axle (18) of the load-transfer device extends. It is also formed with a second arcuate slot (52) of smaller radius which is formed at each opposite end thereof with a ball receiving pocket (53). A controlling ball (54) is disposed in the slot (52).

The link (48) projects outwardly of the locking assembly (40) beyond the side plates (42) and is provided with an aperture (55) for receiving a safety hook device provided, for example, at the end of a lanyard attached to a safety harness or a safety belt. The link (48) has a flat control surface (56) for acting on the ball (54) in a locking condition of the device. The link (48) is biassed to a position in which it extends generally perpendicular to the safety line (11) by means of a leaf spring (57), the opposite ends of which engage around pins (43 and 44) associated with the side plates (42). The spring (57) has a concave central portion which acts upon a pair of spaced pegs (58) upstanding from the link member (48).

A leaf spring, not shown, similar to leaf spring (57) and also associated with the side plate pins (43,44) is provided to act on a pair of upstanding pegs on the cam member (47) to bias the cam member to a position in which the base of the cam member is generally parallel to and spaced from the safety line (11) so that neither gripping edge formation (50) is in contact therewith. The strength of the leaf spring associated with the cam member is relatively soft compared with that of the leaf spring (57) biassing the link (48). The strength of the spring (57) is selected in accordance with the weight of the fall arrest device (40) so as to ensure maintenance of the locking condition thereof in a fall arrest situation.

The fall arrest device (40) may be used in a system in which a safety line (11) is guided along an extensive path of movement of a workman which may have both horizontal and vertial stretches and which may require the device to provide a fall arrest facility in opposite vertical dispositions thereof. For example a workman may wish to move about a scaffolding or gantry system without detaching the device from a safety line extending in a defined path around such system. The path may have a horizontal portion followed by a vertically upwardly extending portion followed by another horizontal portion and possibly thereafter a vertically downwardly extending portion. In this way, the device should provide free movement without any locking occurring during movement along horizontal stretches but should provide a fall arrest locking condition when it is moving upwardly in one vertical disposition of the device and also when the device is inverted to move downwardly along a subsequent vertical portion of the safety line.

When moving along a horizontal stretch of the safety line (11), the cam member (47) is biassed into a central position so that it is not in engagement with the safety line with the ball (54) floating freely along a central portion of the arcuate slot (52). In this condition, the device (40) will be freely movable in either direction along the horizontal portion of the life-line (11) without any locking action taking place. However when the device (40) moves from a horizontal stretch of the life-line (11) to an inclined stretch thereof which is at an angle to the horizontal of greater than a critical angle, for example 45°, the ball (54) will move under gravity to one end of this slot (52) to engage in the ball receiving pocket (53) thereat. Once the ball (54) is engaged in a pocket (53), the locking mechanism (41) will be brought into a locking condition as illustrated in FIG. 4, whenever the link mechanism (48) is automatically centered under the action of leaf spring (57). In normal operation, a tension load in the lanyard is applied to the link (48) causing the link to move to the position shown in FIG. 3 and allowing the cam member (47) to be brought to its unlocked condition under the action of the leaf spring acting thereon. In a fall situation, the upward pull of the lanyard on the link member (48) no longer exists and the link (48) is automatically moved to the position shown in FIG. 4 under the action of leaf spring (57) whereby the flat control surface (56) on the link acts on the ball (54) which is then firmly engaged in the ball pocket (53) thereby causing the cam member (47) to be rotated to its locking position in which a gripping edge formation (50) thereof bites into the life-line (11) to firmly grip the life-line between the formation (50) and an opposed portion of the slipper member (14).

If a second ball is introduced into the arcuate slot (52) in the cam member then the actuation of the device to provide the fall arrest facility will occur with stretches of the life-line which are inclined to the horizontal at smaller angles, for example 30° to 35° instead of the aforesaid 45°. It will be appreciated that the device is brought into this fall arrest operational condition in both directions since ball receiving pockets (53) are provided at each end of the arcuate slot (52) and gripping edge formations (50) are provided at opposite base corners of the cam member (47). Rubber buffer members (59) are provided to protect corner portions of the side plates (42) from engagement with the safety cable (11) and to provide frictional engagement therewith.

Further embodiments of the invention will now be described which are adapted for use in providing a fall arrest facility on inclined surfaces where the safety line is provided at a relatively low level thereon. An example of such an application would be a safety line secured over the sloping faces of a pitched roof as illustrated diagrammatically in FIG. 5. At the apex of the roof, a corner tube (60) is secured by a mounting structure (61). The safety line (11) passes through the tube (60) and the opposite free ends of the safety line are secured with respect to the fixed structure. At intermediate positions along the sloping faces of the roof, the safety line is located by hanger elements (60a) fastened to the roof structure. Each hanger element (60a) comprises an endless rod-like element forming a pair of spaced loops which are joined to one another by a base portion which is secured by a D-shaped bolt to the roof structure. The life-line passes through the spaced loops which can be traversed by the fall arrest devices of the described embodiments of the invention whereby the vertical limbs of the loops engage in a pair of corresponding recesses in the wheels (12,13) to be moved through the load-transfer device as the wheels then rotate relative to the slipper member (14) as described above in connection with the first embodiment of the invention. The fall arrest devices of the following embodiments are adapted to allow an unlocked, free movement of the device along the life-line when the applied load is generally perpendicular to the life-line or at an angle A thereto. In order to traverse the support hangers, the applied load must be maintained at the most at an angle B to the aforesaid perpendicular direction. Furthermore the fall arrest device is required to lock when a person slips down the sloping surfaces of the roof when the applied load will be more generally along the direction of the life-line and up to an angle C with respect thereto. In the construction of the following embodiments to be described for such applications, the profile of the cam member will determine the angle C which controls the locking position of the device and the spring rate of the biassing means will control the maximum angle D of the inclined surface.

Figure 9:
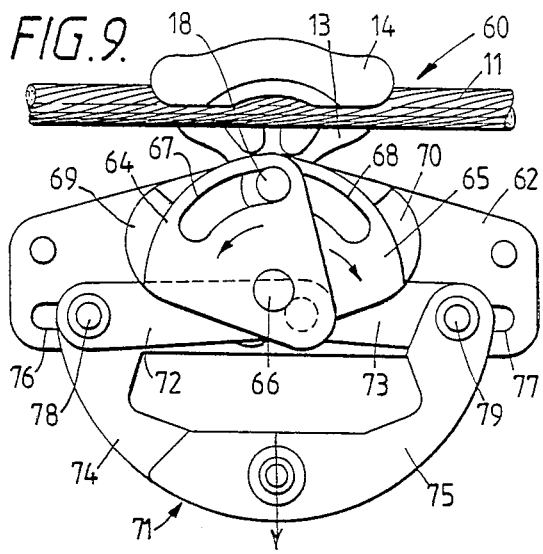
FIGS. 9 and 10 are side views of the embodiment of FIG. 6 with parts thereof removed to show the internal structure of the locking means in an unlocked and locked condition respectively.
Figure 10:
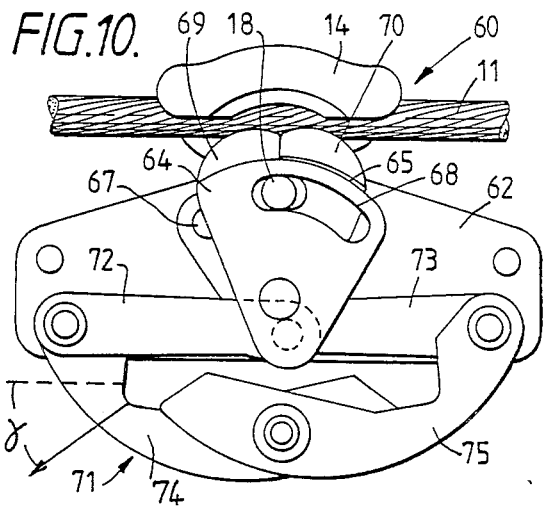

Referring to FIGS. 6 to 10, a further embodiment of a fall arrest device (60) in accordance with the invention again utilizes the common features of the embodiments of FIGS. 1 and 2 and FIGS. 3 and 4 in respect of the spaced recessed wheels and slipper member and the following description will therefore be confined to the locking mechanism of the present embodiment which differs from the mechanisms of the first two embodiments. The locking mechanism (61) utilizes a pair of spaced side plates (62) having buffer members (63) protecting corners thereof which may come in contact with the safety cable (11). A pair of locking cam members (64,65), each of generally triangular shape, are pivotally mounted in the space between the side plates (62) about aligned stub axles (66). Each cam member has an arcuate slot (67,68) and the axle (18) of the recessed wheels (12,13) passes through both slots (67 and 68). Each cam member has a respective gripping projection (69 and 70) at respective opposite ends of the arcuate bases of the cam members. The slots (67,68) are configured to allow movement of the cam members between positions in which the gripping projections (69 and 70) are contained within the body part of the locking device as shown in FIG. 9 and positions in which the gripping projections (69 and 70) are brought into gripping engagement with the safety cable (11) as shown in FIG. 10.

Movement of the cam members (64,65) is controlled by a linkage (71) to which an applied load is connected to maintain the device in an unlocked position as shown in FIG. 9 permitting free movement along the safety line (11) The linkage is also adapted to bring the cam members into the locked condition as shown in FIG. 10 in a fall situation when a person slips down an inclined surface on which he is working.

The linkage (71) comprises, for each cam member (64,65), a first straight link (72,73) which at one end is pivotally connected to the respective cam member at a position between the pivotal axis of the cam member and the apex of the cam member. The linkage further comprises, for each cam member, a cranked link (74,75) which is pivotally connected to the other end of the straight link (72,73) by means of a pin (78,79) which projects into a straight slot (76,77) formed in one of the side plates (62) of the locking mechanism so that pins (78,79) are slidable in directions parallel to the safety line (11). The opposite ends of the cranked links (74,75) overlap one another and are hingedly connected to one another by means of a stud (80) integral with the link (75) which projects through an aperture in the link (74). Elongate recesses (81) are formed in confronting surfaces of the overlapping portions of links (74,75) and the stud (80) projects from the base of the recess (81) formed in the link (75). A torsion spring (82) has a central coiled portion which engages around the stud (80) and has a pair of axially spaced arms, one of which engages in a recess (81) in the link (74) and the other of which engages in the recess (81) in the link (75). The torsion spring acts to bias the linkage (71) to the position shown in FIG. 10 such that the locking mechanism is brought into its locked condition.

In use, a lanyard end hook fitting is engaged around the cooperating cranked link (74,75) which project outwardly of the side plates (62) of the locking mechanism. Whilst tension is maintained in the lanyard in a direction generally perpendicular to the safety line (11), the linkage (71) is maintained in the position shown in FIG. 9 whereby the locking mechanism is in its unlocked condition. When a person slips down the inclined surface, the lanyard hook fitting moves to one end or the other of the elongate space defined between the cooperating cranked links (74,75) and the side plate (62) of the locking mechanism whereupon the torsion spring is then free to act on the cranked links (74,75) to bring the linkage (71) into the position shown in FIG. 10 thereby effecting locking of the device (60) to the safety cable (11). It will be appreciated that the device operates on each of the oppositely inclined roof surfaces, as illustrated in FIG. 5, since the locking mechanism is actuated when the lanyard hook is moved to either end of the aforesaid space between the crank links (74,75) and the side plate (62). In practical embodiments of the invention, the construction and strength of the torsion spring will be such that a positive locking action will be induced when the direction of the force applied to the locking device by the lanyard is within the range of a direction parallel to the safety cable (11) at an angle C thereto where C is of the order of 40°.

Figure 11:
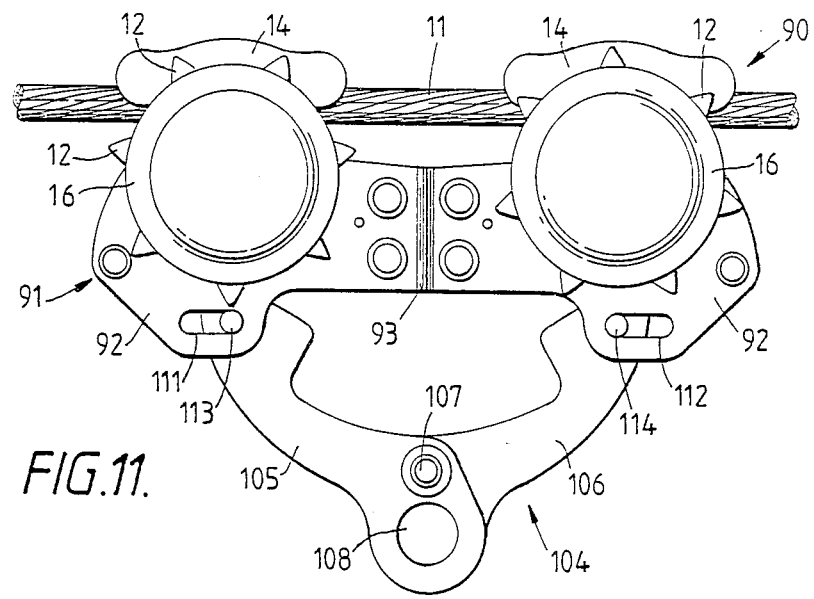
FIG. 11 is a side view of a fourth embodiment.
Figure 12:
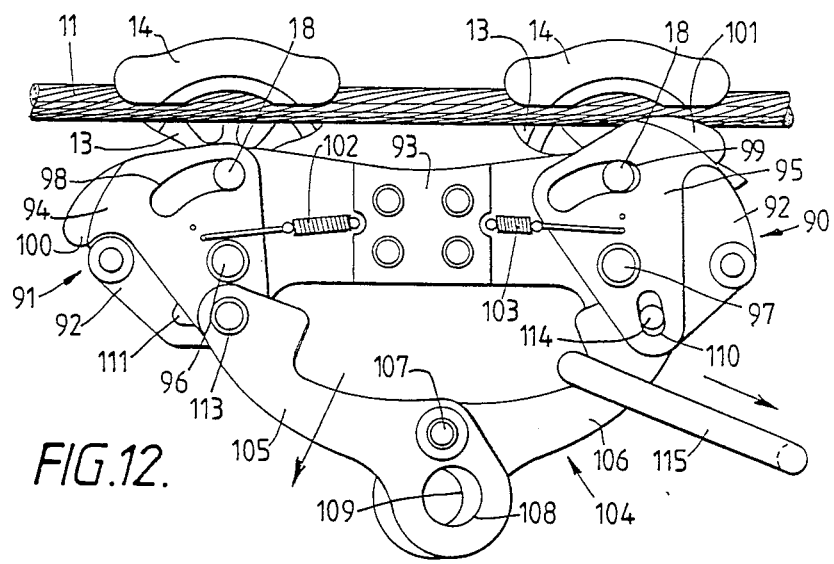
FIG. 12 is a view similar to FIG. 11 with parts removed to show the internal structure.

The embodiment shown in FIGS. 11 and 12 constitutes a fall arrest device (90) for use in applications similar to those described in connection with the embodiment of FIGS. 6 to 10. The device (90) utilizes a pair of recessed wheel and slipper member assemblies as described above in connection with the embodiment of FIGS. 1 and 2 and similar parts have been given similar reference numerals. The two wheel and slipper member assemblies are mounted on a common body part (91). The body part (91) comprises two portions, each comprising a pair of spaced plates (92), and each portion is hingedly connected together by a rubber or metal hinge. In the embodiment shown in the drawings, a flat rubber element (93) joins the two portions of the body part at a central position engaging between the two sets of space plates (92) thereof and is rivetted to such side plates. This construction allows a limited amount of articulation between the two portions of the body part about an axis perpendicular to the safety cable (11) so that the two parts can be hinged with respect to one another through an angle of something of the order of 15° to 20° to allow the device to negotiate curved sections of the safety cable (11) or other changes in direction thereof.

A locking cam (94,95) is provided between the spaced side plates (92) of each portion of the body part (91) of the locking mechanism and is pivotally mounted on an axle (96,97) extending between those side plates. Each cam has an arcuate slot (98,99) through which the axle (18) of the respective sets of recessed wheels (12,13) extends. Each locking cam has a gripping formation (100,101) for gripping engagement with the safety cable (11) to trap the cable between the gripping formation and the slipper member (14) as illustrated in respect of cam member (95) in FIG. 12. The slot (98,99) in the cam member allows the cam to be pivotally moved between a free position as shown in respect of cam (94) in FIG. 12 and a gripping position as shown in respect of cam (95) in FIG. 12). Tension springs (102,103) are connected between respective side plates (92) and respective cam members (94,95) so as to bias the cam members into their locking positions.

Movement of the cams (94,95) between locked and unlocked conditions thereof is controlled by a linkage (104) which comprises a pair of link arms (105,106) which are pivotally connected at one end to the cam members (94,95) respectively and are pivotally connected to one another by a pin (107) at overlapping end portions thereof. The overlapping end portions of the links (105,106) are formed to have corresponding eyelets (108,109) for receiving, when aligned, a lanyard hook as described below. The retaining pin (107) loosely engages in oversized apertures in the end portions of links (105,106) so as not to hinder articulation of the body part (91) of the locking mechanism when the fall arrest device (90) is required to negotiate a change of direction in the safety cable (11).

Each cam member is formed with a short straight slot (110) located between the pivotal axis of the cam and the apex thereof and extending from the apex towards the base of the generally triangular form of the cam member. The side plates (92) are formed with aligned slots (111,112) which extend in a direction generally parallel to the safety cable (11). Pins (113,114) are provided to connect the links (105,106) to respective cams (94,95). The pins which pass through apertures in the respective links (105,106) project therefrom to engage in the slot (110) in the respective cam member and also in the corresponding slots (111,112) in the side plates (92) of the body part (91). Movement of the cams (94,95) from their gripping position as shown in respect of cam (95) in FIG. 12, which is normally maintained under the action of the tension springs (102,103), is effected by providing a force on the linkage (104) in a direction generally perpendicular to the safety cable (11) to bring the linkage into the position shown in FIG. (11) with the pins (113,114) at the ends of the slots (111,112) nearest one another whereby the cams are moved against their biassing springs to an unlocked condition as shown in respect of cam (94) in FIG. 12. In this position, the eyelets (108,109) are in axial aligned with one another as illustrated in FIG. 11 so that the unlocked condition can be maintained by engaging a lanyard hook through the aligned eyelets whereby free movement along the safety cable (11) can be achieved and the fall arrest facility of the device is thereby rendered inoperative. This would be a desirable condition for working on horizontal stretches of the safety cable (11).

A fixed link or ring (115) is engaged around the link arms (105,106) to permit a connection thereto of a lanyard hook for use of the device on inclined surfaces where the fall arrest facility is required. Under normal working conditions, the link (115) is subjected to a tension from the lanyard in a direction generally perpendicular to the safety cable (11) so that it applies a generally outward pull to the linkage maintaining it in the unlocked condition as shown in FIG. 11. In a fall situation, the direction of force applied by the lanyard would be in a more sideways direction whereby the link (115) will be moved to one end or other of the space defined between the linkage (104) and the body part (91) of the device, as illustrated in FIG. 12, such that the tension springs (102,103) will be free to act on the cam members (94,95) to bring them into gripping engagement with the safety cable (11).

It is conceivable that for applications where a safety cable having no intermediate hanger members is provided, the recessed wheels (12,13) of the above-described devices could be replaced by side plates secured to the slipper member (14) since the devices would then not be required to pass or traverse intermediate support devices for the safety cable (11).

I claim:

1. A load attachment device for sliding engagement with an inclined, vertical or near vertical elongate member having fixed location elements located at spaced positions therealong, said device comprising:
   at least one rotary wheel having radially projecting parts defining recesses formed in the periphery of the wheel at spaced locations therearound;
   a slipper means for sliding engagement with the elongate member such as to cooperate with said projecting parts of the wheel to allow rotation of the wheel with respect to the slipper member while locating the elongate member with respect to the wheel, whereby a location element can engage in a recess in the wheel which then rotates relative to the slipper member to pass the location element through the device;
   a body part on which said wheel is rotatably located;
   locking means mounted on said body part for movement between a locking condition in which the elongate member is firmly gripped between the locking means and said slipper member, and an unlocked condition in which said device is freely slidable along the elongate member;
   biassing means coupled between said body part and said locking means for bringing said locking means to said locking condition when an applied loading required to maintain said locking means in said unlocked condition is removed; and
   a slider means extending from said body part in a direction along the elongate member and having projecting means for sliding engagement with said elongate member when said body part is rotatably tilted about the axis of rotation of said wheel to maintain a spacing between the body part and the elongate member in at least the entire area adjacent the slipper means, which spacing is sized to enable the free passage of a location element through the device, whereby the device can actuate itself to automatically traverse said location elements.

2. A device as claimed in claim 1, wherein said locking means comprises a pivotally mounted locking member having a grip portion formed on a part thereof on one side of the pivotal axis of the locking member and an attachment portion, to which a load can be connected to the device, on the opposite side of said pivotal axis.

3. A device as claimed in claim 2, wherein said slider means comprises a movable member mounted at an upwardly projecting portion of the body part, and having means for engaging the locking member so that when the device is grabbed in an emergency, the movable member is depressed to act on the locking member so as to cause the locking means to be brought into its locking condition.

4. A device as claimed in claim 2, wherein said biassing means comprises longitudinally extendable resilient means connected at one end portion thereof with respect to the body part and at the other end portion thereof with respect to the locking member at a position thereon which moves progressively nearer to an imaginary line passing through the connection location between the resilient means and the body part, and through the axis of rotation of the locking member, as the locking member moves towards its unlocked condition, thereby progressively weakening the force applied by the biasing means as the locking member moves to its unlocked condition.

5. A load attachment device for sliding engagement with an inclined, vertical or near vertical elongate member having fixed location elements secured thereto at spaced positions therealong, said device comprising:
   at least one rotary wheel having radially projecting parts defining recesses formed in the periphery of the wheel at spaced locations therearound;
   a slipper means for sliding engagement with the elongate member such as to cooperate with said projecting parts of the wheel to allow rotation of the wheel with respect to the slipper member while locating the elongate member with respect to the wheel, whereby a location element can engage in a recess in the wheel which then rotates relative to the slipper member to pass the location element through the device;
   a body part on which said wheel is rotatably located;
   locking means mounted on said body part for movement between a locking condition in which the elongate member is firmly gripped between the locking means and said slipper member, and an unlocked condition in which said device is freely slidable along the elongate member;
   biassing means coupled between said body part and said locking means for bringing said locking means to said locking condition when an applied loading required to maintain said locking means in said unlocked condition is removed;
   said biassing means comprising longitudinally extendable resilient means connected at one end portion thereof with respect to the body part and at the other end portion thereof with respect to the locking means at a position thereon which moves progressively nearer to an imaginary line passing through the connection location between the resilient means and the body part, and through the axis of rotation of the locking means, as the locking means moves towards its unlocked condition, thereby progressively weakening the force applied by the biassing means as the locking means moves to its unlocked condition.

6. A device as claimed in claim 5, wherein said locking means comprises a locking member having a grip portion formed on a part thereof on one side of the pivotal axis of the locking member for gripping the elongate member in the locked condition and an attachment portion, to which a load can be connected to the device, on the opposite side of said pivotal axis.

7. A device as claimed in claim 5 including a slider means projecting from said body part for sliding engagement with said elongate element when said body part is rotatably tilted about the axis of rotation of said wheel to maintain a spacing between the body part and the elongate member, the spacing being sized to enable the free passage of a location element through the device whereby the device can automatically traverse said location elements.

8. A device as claimed in claim 7, wherein said slider means comprises a movable member mounted at an upwardly projecting portion of the body part, and having means for engaging the locking member so that when the device is grabbed in an emergency, the movable member is depressed to act on the locking member so as to cause the locking means to be brought into its locking condition.

9. A load attachment device comprising a slipper member adapted to engage an elongate member for sliding movement therealong, and load sensitive locking means having an unlocked condition permitting free sliding movement of the device and a locked condition in which a grip portion of the locking means engages and grips said elongate member between said grip portion and said slipper member, said elongate member being slidably engaged, in use, with the slipper member, said locking means including:

biassing means to cause the locking means to be brought automatically into its locked condition when an applied loading, which is required to maintain the locking means in its unlocked condition on said elongate member, or portions of said elongate member, which is in an inclined, or a vertical, or near vertical position is removed, wherein said locking means are adapted to be maintained in said unlocked condition when said loading is applied thereto in a direction within a range defined between a line generally parallel to the elongate member, and a predetermined acute angle thereto, and wherein said locking means comprise a pivotally mounted locking member having at least said one grip portion provided thereon adapted to engage and grip the elongate element upon pivotal movement of the locking member in one or both directions, and having an arcuate slot therein formed with a pocket at least at one end of the slot, the pocket being adapted to receive and locate a rolling element located in the slot, and said locking member being maintained to a position in which the at least one grip portion is out of contact with an elongate element engaged in use with said slipper member, and a pivotally mounted loaded attachment member having a control surface means for acting on said rolling element when located in said pocket, whereby, when the device moves onto an inclined, or a vertical or near vertical portion of the elongate element, the rolling member moves under gravity from said slot into said pocket, the load attachment member being biassed so that when said loading applied thereto is removed, said control surface acts on the rolling element in said pocket to cause the locking member to pivot and bring the at least one grip portion into locking engagement with the elongate member engaged with said slipper member.

10. A load attachment device comprising a slipper member for engaging an elongate member for sliding movement therealong, and load sensitive locking means having an unlocked condition permitting free sliding movement of the device and a locked condition in which a grip portion of the locking means engages and grips an elongate member between said grip portion and said slipper member, said elongate member being slidably engaged, in use, with the slipper member, the locking means including biassing means to cause the locking means to be brought automatically into its locked condition when an applied loading, which is required to maintain the locking means in its unlocked condition on said elongate member, or portions of said elongate member, which is in an inclined, or a vertical, or near vertical position, is removed, wherein said locking means is maintained in said unlocked condition when said loading is applied thereto in a direction perpendicular to said elongate member, with which the slipper member is engaged in use, and at acute angles thereto up to a predetermined maximum acute angle wherein said locking means comprise a body part, at least one locking member pivotally mounted on the body part and having said grip portion provided thereon, and a control linkage for moving the at least one locking member between a locked and an unlocked condition, said linkage comprising a pair of first links pivotally connected together at a set of overlapping ends thereof with the respective other ends of the links having sliding means engaging in respective slots in the body part, the slots being elongated in a direction generally parallel to said elongate member engaged, in use, with said slipper member, and at least one second link pivotally connected directly to said other end of a respective first link and to said locking member so that the locking member is moved between its locked and unlocked conditions when the associated sliding means slides along its slot, and wherein said first links project from the body part and are adapted to define an enclosed space therebetween enabling a load connector element to be engaged around the first links so that when said loading is applied to the first links, said sliding means move towards adjacent ends of said slots causing the locking member to move to its unlocked condition and when said loading is no longer applied to the first links in a generally outward direction with respect to said elongate member, said biassing means cause the locking member to be removed to its locked condition.

11. A device as claimed in claim 10, wherein said at least one locking member comprises a pair of pivotally mounted locking members and wherein said at least one second link comprises a pair of second links for pivoting said locking members, respectively, in mutually opposite rotational directions, between their locked and unlocked conditions.

12. A load attachment device comprising a slipper member means for engaging an elongate member for sliding movement therealong, and load sensitive locking means having an unlocked condition permitting free sliding movement of the device and a locked condition in which a grip portion of the locking means engages and grips said elongate member between said grip portion and said slipper member means, said elongate member being slidably engaged, in use, with the slipper member means, the locking means including biassing means to cause the locking means to be brought automatically into its locked condition when an applied loading, which is required to maintain the locking means in its unlocked condition on said elongate member, or portions of said elongate member, which is in an inclined, or a vertical, or near vertical position, is removed, wherein said locking means are adapted to be maintained in said unlocked condition as aforesaid when said loading is applied thereto in a direction perpendicular to said elongate member means, with which the slipper member is engaged in use, and at acute angles thereto up to a predetermined maximum acute angle, and wherein said slipper member means includes a pair of slipper members adapted for slidingly engaging said elongate member at spaced locations therealong, a common body part having said locking members thereon, said locking means including a pair of locking members pivotally mounted thereon to cooperate with the slipper members respectively, and a control linkage for moving the locking members between a locked and an unlocked condition, said linkage comprising a pair of first links pivotally connected with respect to one another at a set of overlapping ends thereof, with the respective other ends of the links having sliding means engaging in respective slots in the body part, the slots being elongated in a direction generally parallel to an elongate member engaged, in use, with said slipper members, said sliding means also engaging in further slots formed in said locking members respectively, so that the locking members are moved between their locked and unlocked conditions when the sliding means slide along the associated slots in the body part, wherein said first links project from the body part to defined an enclosed space therebetween enabling a load connector element to be engaged around the first links so that when said loading is applied to the first links, said sliding means move towards respective ends of said slots in the body part causing the locking members to move to their unlocked conditions and when said loading is no longer applied to said first links in a generally outward direction with respect to an elongate member, said biassing means cause the locking members to be moved to their locked conditions.

13. A device as claimed in claim 12, wherein said body part is articulated at a position between said slipper members to enabled the device to negotiate non-linear sections of said elongate member.

14. A device as claimed in claim 13, wherein said overlapping ends of the first links are provided with apertures which are aligned when the locking means is in its unlocked condition permitting a load connected to be engaged therethrough to maintain the locking means in the unlocked condition.

* * * * *